(12) United States Patent
Zhang

(10) Patent No.: US 8,030,808 B2
(45) Date of Patent: Oct. 4, 2011

(54) ROTOR FOR A DIRECT CURRENT DRIVE MOTOR AND A METHOD FOR PRODUCING THE SAME

(75) Inventor: Xu Zhang, Zhongshan (CN)

(73) Assignee: Zhongshan Broad-Ocean Motor Co., Ltd., Zhongshan (CN)

( * ) Notice: Subject to any disclaimer, the term of this patent is extended or adjusted under 35 U.S.C. 154(b) by 155 days.

(21) Appl. No.: 12/471,464

(22) Filed: May 25, 2009

(65) Prior Publication Data

US 2010/0133927 A1  Jun. 3, 2010

(30) Foreign Application Priority Data

Dec. 3, 2008  (CN) .......................... 2008 1 0219778

(51) Int. Cl.
*H02K 9/00* (2006.01)
*H02K 1/04* (2006.01)
(52) U.S. Cl. ................ 310/43; 310/61; 310/62; 310/6 A
(58) Field of Classification Search .................... 310/43, 310/156.08–156.13, 59, 61–63, 60 A, 67 R
See application file for complete search history.

(56) References Cited

U.S. PATENT DOCUMENTS

| | | | | |
|---|---|---|---|---|
| 5,040,285 A | * | 8/1991 | Williams et al. | 29/596 |
| 5,778,703 A | * | 7/1998 | Imai et al. | 68/12.02 |
| 5,907,206 A | * | 5/1999 | Shiga et al. | 310/156.05 |
| 6,396,177 B1 | * | 5/2002 | Shin et al. | 310/63 |
| 2002/0166349 A1 | * | 11/2002 | Lim et al. | 68/23.7 |
| 2005/0071985 A1 | * | 4/2005 | Won et al. | 29/598 |

* cited by examiner

*Primary Examiner* — Quyen Leung
*Assistant Examiner* — Leda Pham
(74) *Attorney, Agent, or Firm* — Matthias Scholl P.C.; Matthias Scholl

(57) ABSTRACT

An external rotor for a direct current drive motor with a side wall, an end cover, a cavity, an opening, a base, a magnetic tile, a center hole, and a magnetic yoke shell. A method for producing an external rotor for a direct current drive motor by integrally forming by injection molding a magnetic yoke shell and multiple magnetic tiles; forming a side wall on said magnetic yoke shell and an end cover at the bottom of said side wall; forming a base at the center of said end cover; and integrally forming by injection molding said base and a rotating spline.

15 Claims, 6 Drawing Sheets

ROTOR FOR A DIRECT CURRENT DRIVE MOTOR AND A METHOD FOR PRODUCING THE SAME

CROSS-REFERENCE TO RELATED APPLICATIONS

Pursuant to 35 U.S.C. §119 and the Paris Convention Treaty, this application claims the benefit of Chinese Patent Application No. 200810219778.6 filed on Dec. 3, 2008, the contents of which are incorporated herein by reference.

BACKGROUND OF THE INVENTION

1. Field of the Invention

The invention relates to a rotor, and more particularly to an external rotor for a direct current drive motor and a method for producing the same.

2. Description of the Related Art

Elements of conventional external rotors for direct current drive motors include a side wall, an end cover, a cavity, an opening, a magnetic conductive housing, and a magnetic tile. Generally, the end cover is disposed at the bottom of the side wall, the cavity is formed between the side wall and the end cover, the magnetic conductive housing is disposed on the side wall, and the magnetic tile is disposed on the inner wall of the magnetic conductive housing.

However, some of the problems encountered with conventional external rotors are that they are heavy, expensive and difficult to produce, feature poor integrity, and often generate excessive vibration during operation. Moreover, disadvantages of conventional methods for producing external rotors include complexity of production process, poor integrity of rotor components, and high cost.

SUMMARY OF THE INVENTION

In view of the above-described problems, it is an objective of the invention to provide an external rotor for a direct current drive motor that is light, cost-effective and easy to produce, features good integrity, and prevents excessive vibration during operation.

It is another objective of the invention to provide a method for producing an external rotor for a direct current drive motor that is a complex production process, and the external rotor produced thereby features good integrity and low cost.

To achieve the above objective, in accordance with one aspect of the present invention, there is provided an external rotor for a direct current drive motor, comprising a side wall, an end cover, a cavity, an opening, a base, a magnetic tile, a center hole, and a magnetic yoke shell, wherein the end cover is disposed at the bottom of the side wall, the side wall and the end cover are integrally formed by injection molding, the cavity is formed between the side wall and the end cover, the opening is disposed at the top of the housing, the base is disposed at the center of the end cover, the center hole is disposed at the center of the base, and the magnetic yoke shell and the magnetic tile are received in the side wall.

In certain classes of this embodiment, the rotor further comprises multiple wind wheels.

In certain classes of this embodiment, the base is connected to the side wall via the wind wheels.

In certain classes of this embodiment, the rotor further comprises an air inlet disposed between adjacent wind wheels.

In certain classes of this embodiment, the wind wheels are connected with each other via multiple first supporting ribs, and multiple second supporting ribs are disposed at the bottom of the wind wheels.

In certain classes of this embodiment, the thickness of the wind wheel reduces gradually from the center thereof, so that axial airflow is generated as the rotor rotates forwardly or reversely.

In certain classes of this embodiment, the center hole and the base are integrally formed by injection molding.

In certain classes of this embodiment, the rotor further comprises a rotating spline connected to the base.

In certain classes of this embodiment, the center hole is disposed in the rotating spline, the rotating spline comprises multiple teeth (20), and the teeth (20) are arc-shaped, rectangular, triangular, involute, ladder-shaped or sawtooth-shaped.

In certain classes of this embodiment, multiple cylinders are disposed around the rotating spline, and multiple annular grooves are disposed at the center of the rotating spline.

In certain classes of this embodiment, the rotor further comprises a rotating spline disposed in the base.

In certain classes of this embodiment, the center hole is disposed in the rotating spline, the rotating spline comprises multiple teeth, and the teeth are arc-shaped, rectangular, triangular, involute, ladder-shaped or sawtooth-shaped.

In certain classes of this embodiment, multiple cylinders are disposed around the rotating spline, and multiple annular grooves are disposed at the center of the rotating spline.

In certain classes of this embodiment, multiple axial supporting ribs and annular supporting ribs connected with each other are disposed at the top and the bottom of the base.

In certain classes of this embodiment, multiple grooves are disposed on both ends of the side wall, the number of the grooves is the same as that of the magnetic tiles, and the grooves are step-shaped.

In certain classes of this embodiment, the magnetic tiles are tightly pressed by the side wall and abut against the side wall.

In accordance with another aspect of the present invention, there is provided a method for producing an external rotor for a direct current drive motor, comprising integrally forming by injection molding a magnetic yoke shell and multiple magnetic tiles, forming a side wall on the magnetic yoke shell and an end cover at the bottom of the side wall, forming a base at the center of the end cover, and integrally forming by injection molding the base and a rotating spline.

Advantages of the external rotor according to the invention include the following:

1) it is light, cost-effective and easy for production;
2) it features good integrity; and
3) it can act as a buffer and is capable of reducing excessive vibration in operation.

Advantages of the method for producing an external rotor for a direct current drive motor include the following:

1) it is a complex production process; and
2) the external rotor produced thereby features good integrity and is low cost.

BRIEF DESCRIPTION OF THE DRAWINGS

Detailed description will be given below with reference to accompanying drawings, in which.

DETAILED DESCRIPTION OF THE EMBODIMENTS

Figure 1:
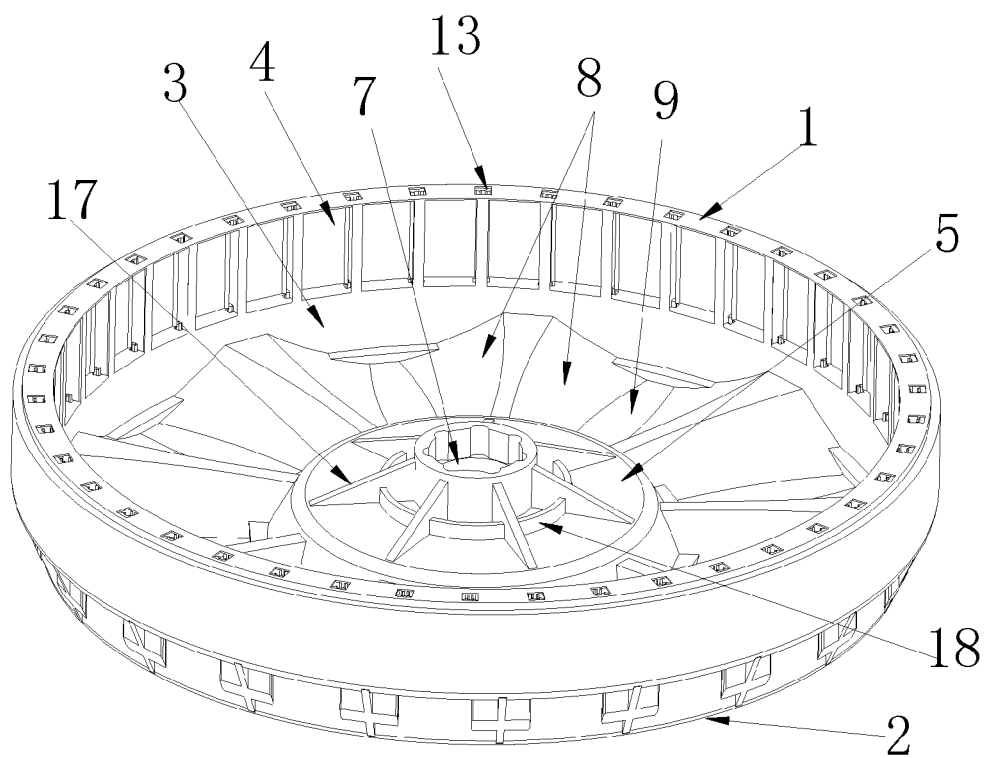
FIG. 1 is a front view of an external rotor for a direct current drive motor according to an exemplary embodiment of the invention.
Figure 2:
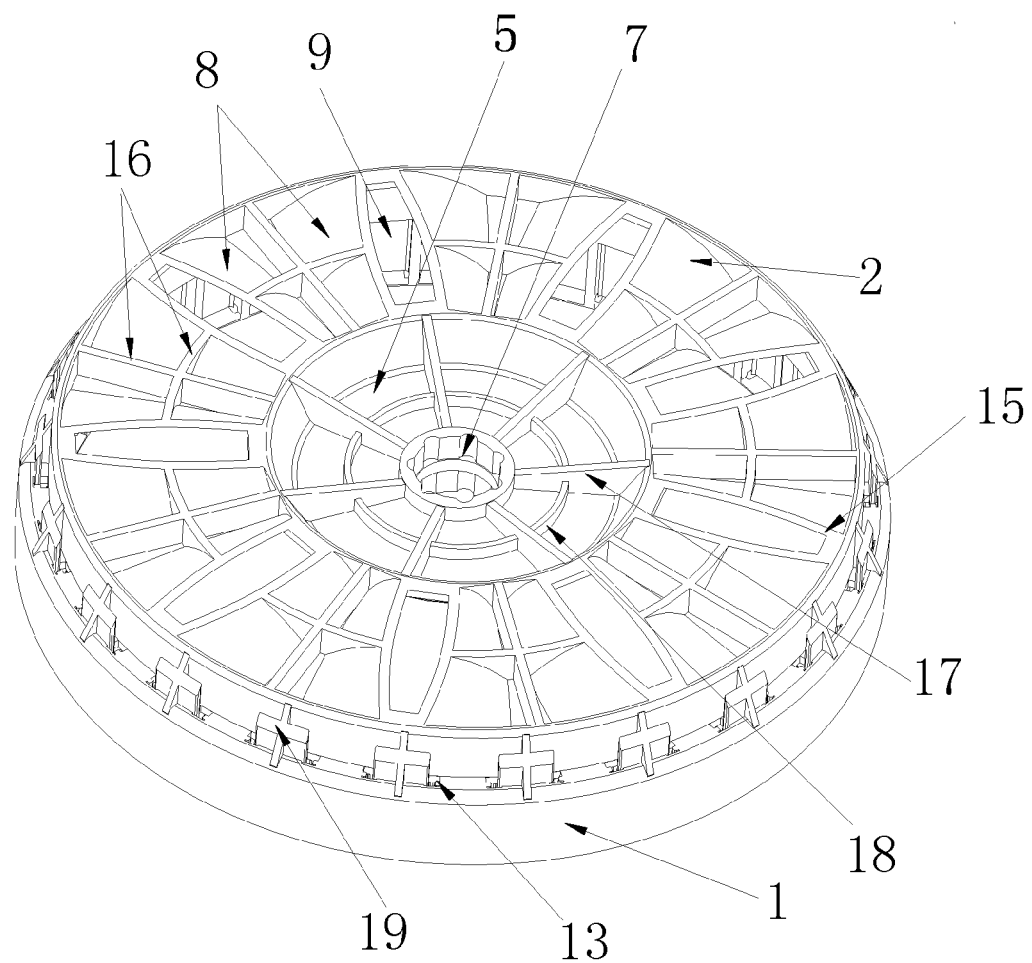
FIG. 2 is a back view thereof.
Figure 3:
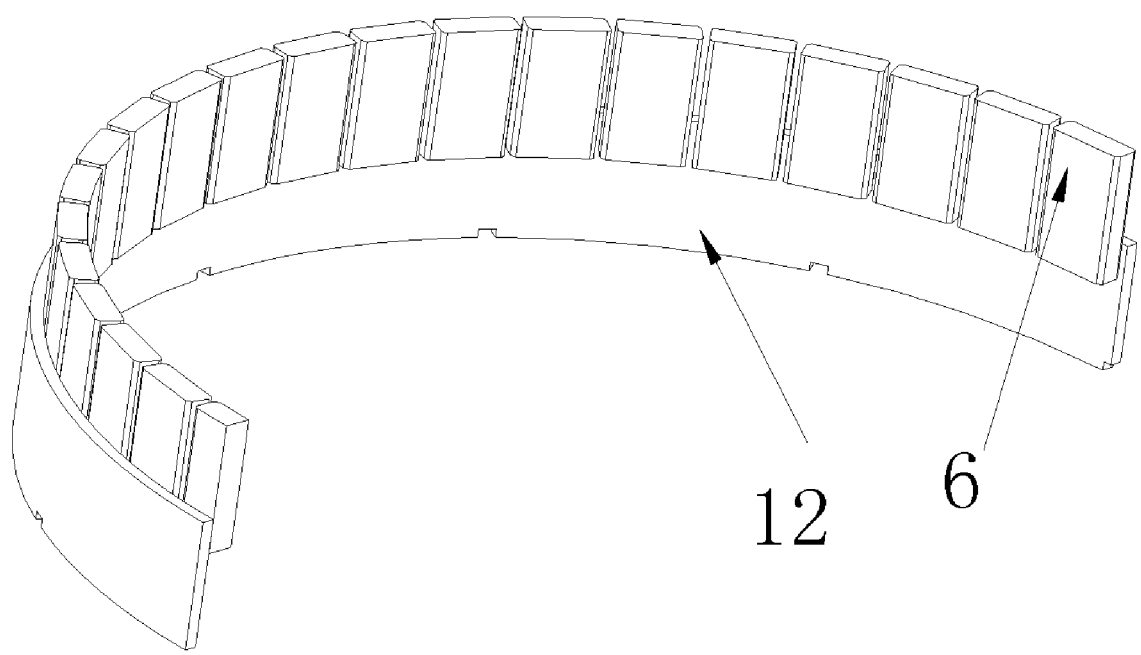
FIG. 3 is a schematic view of a magnetic yoke shell and a magnetic tile of an exemplary embodiment of the invention.
Figure 4:
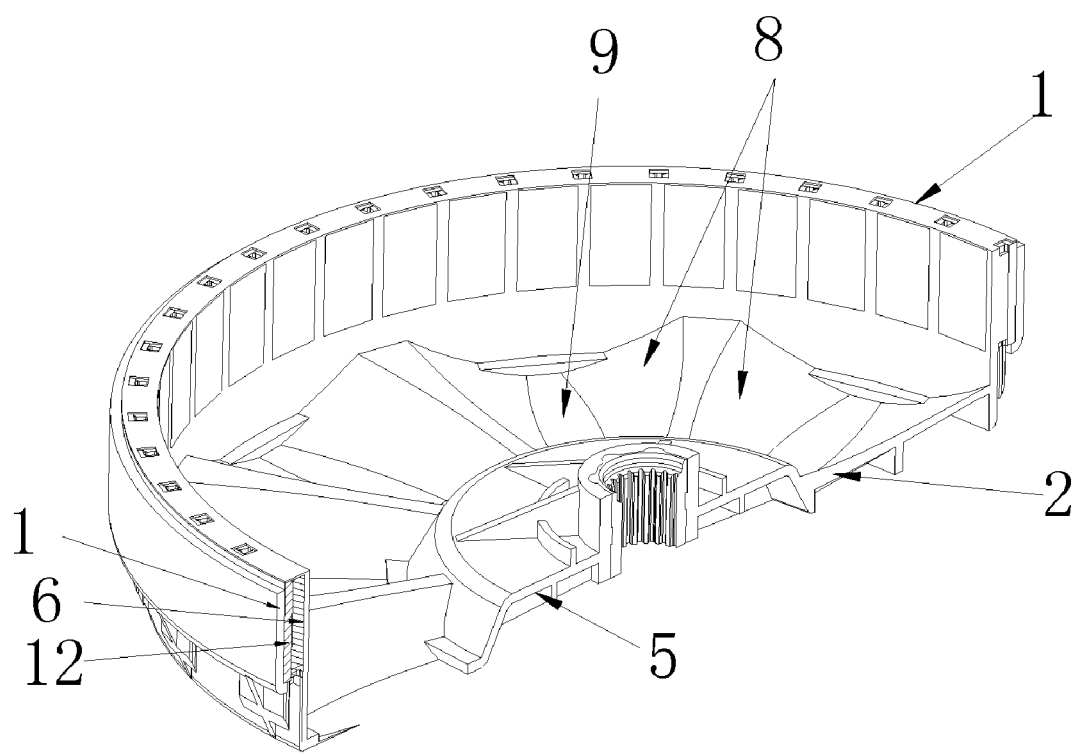
FIG. 4 is a perspective view of a cut through section of the external rotor according to an exemplary embodiment of the invention.
Figure 5:
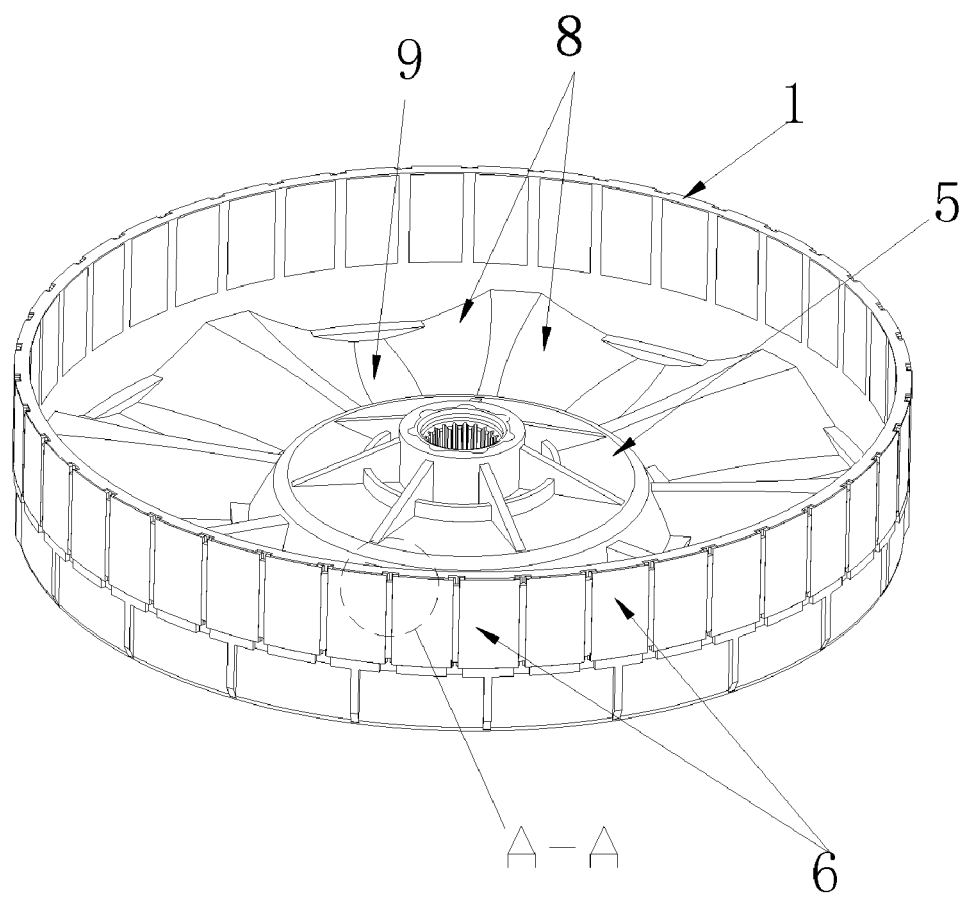
FIG. 5 is a schematic view of the external rotor without a magnetic yoke shell and a magnetic tile.
Figure 6:
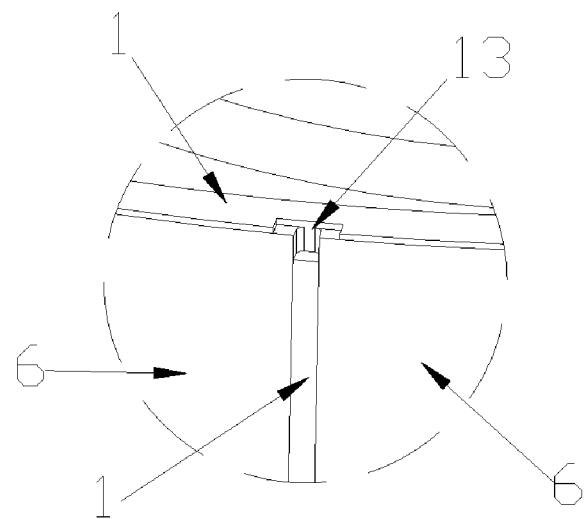
FIG. 6 is an enlarged view along the A-A line in FIG. 5.
Figure 7:
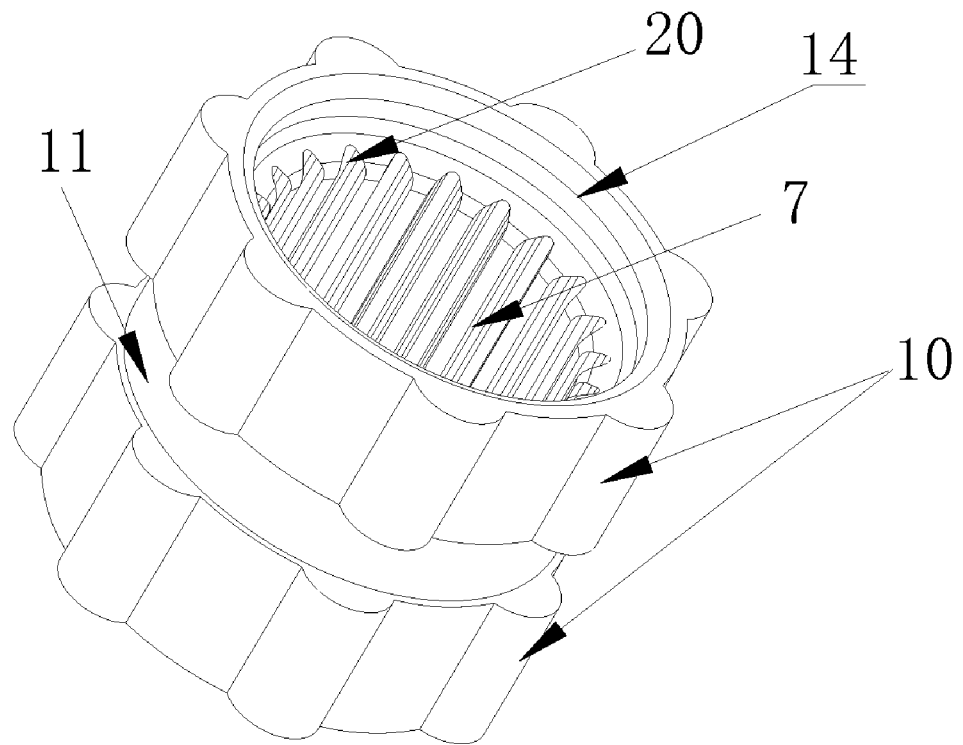
FIG. 7 is a schematic view of a rotating spline according to an exemplary embodiment of the invention.

As shown in FIGS. 1-7, an external rotor for a direct current drive motor of the invention comprises a side wall 1, an end cover 2, a cavity 3, an opening 4, a base 5, a magnetic tile 6, a center hole 7, and a magnetic yoke shell 12.

The end cover 2 is disposed at the bottom of the side wall 1, and both of them are integrally formed by injection molding.

The cavity 3 is formed between the side wall 1 and the end cover 2.

The opening 4 is disposed at the top of the housing.

The base 5 is disposed at the center of the end cover 2, and is connected to the side wall 1 via multiple wind wheels 8.

An air inlet 9 is disposed between adjacent wind wheels 8. The thickness of the wind wheel 8 reduces gradually from the center thereof, so that axial airflow is generated as the rotor rotates forwardly or reversely. Each of the wind wheels 8 is in a shape of an inverted V. All the wind wheels 8 are distributed circumferentially, and the number thereof is between 2 and 60.

The wind wheels 8 are connected with each other via multiple first supporting ribs 15, so as to increase structural strength of the rotor.

Multiple second supporting ribs 16 are disposed at the bottom of the wind wheels 8, so as to connect both sides of the wheel 8, the side wall 1 and the base 5. The second supporting ribs 16 are cross-shaped, Y-shaped, or V-shaped.

The magnetic tile 6 and the magnetic yoke shell 12 are received in the side wall 1. The magnetic tiles 6 are pressed by and abut against the side wall 1.

The center hole 7 is disposed at the center of the base 5.

An air inlet 9 is disposed between adjacent wind wheels 8.

A rotating spline 14 is connected to the base 5, and the center hole 7 is disposed in the rotating spline 14. Multiple cylinders 10 are disposed around the rotating spline 14, and multiple annular grooves 11 are disposed at the center of the rotating spline 14. In other embodiments, the rotating spline 14 may be omitted or disposed in the base 5. As the rotating spline 14 is omitted, the center hole 7, and the base 5 are integrally formed by injection molding.

The rotating spline 14 comprises multiple teeth 20. The teeth 20 are arc-shaped, rectangular, triangular, involute, ladder-shaped or sawtooth-shaped.

Multiple axial supporting ribs 17 and annular supporting ribs 18 connected with each other are disposed at the top and the bottom of the base 5, so as to increase the structural strength of the rotor.

Multiple grooves 13 are disposed on both ends of the side wall 1. The number of the grooves 13 is the same as that of the magnetic tiles 6, and the grooves 13 are step-shaped.

Multiple third supporting ribs 19 are disposed on the side wall 1, so as to increase the structural strength of the rotor. In other embodiments, the third supporting ribs 19 are Y-shaped, or V-shaped.

A method for producing an external rotor for a direct current drive motor comprises: integrally forming by injection molding a magnetic yoke shell and multiple magnetic tiles, forming a side wall on the magnetic yoke shell and an end cover at the bottom of the side wall, forming a base at the center of the end cover, and integrally forming by injection molding the base and the rotating spline.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An external rotor for a direct current drive motor, comprising a side wall (1); an end cover (2) directly connected to said side wall (1); a cavity (3) formed between said side wall (1) and said end cover (2); a plurality of openings (4) formed in said side wall (1); a base (5) disposed at the center of said end cover (2); a plurality of magnetic tiles (6) received in a plurality of said openings (4); a magnetic yoke shell (12) disposed against said side wall (1); a center hole (7) disposed at the center of said base (5); multiple wind wheels (8); and an air inlet (9) disposed between adjacent wind wheels (8); wherein said side wall (1) and said end cover (2) are integrally formed by injection molding and said base (5) is connected to said side wall (1) via said wind wheels (8), whereby improving the integrity of the external rotor.

2. An external rotor for a direct current drive motor, comprising a side wall (1); an end cover (2) directly connected to said side wall (1); a cavity (3) formed between said side wall (1) and said end cover (2); a plurality of openings (4) formed in said side wall (1); a base (5) disposed at the center of said end cover (2); a plurality of magnetic tiles (6) received in a plurality of said openings (4); a magnetic yoke shell (12) disposed against said side wall (1); a center hole (7) disposed at the center of said base (5); and multiple wind wheels (8); wherein said side wall (1) and said end cover (2) are integrally formed by injection molding;

wherein said wind wheels (8) are connected with each other via multiple first supporting ribs (15); and multiple second supporting ribs (16) are disposed at the bottom of said wind wheels (8) whereby reinforcing said wind wheels (8).

3. The rotor of claim 2, wherein the thickness of said wind wheel (8) reduces gradually from the center thereof, whereby generating axial airflow as the rotor rotates forwardly or reversely.

4. The rotor of claim 2, wherein said center hole (7) and said base (5) are integrally formed by injection molding.

5. The rotor of claim 2, further comprising a rotating spline (14) connected to said base (5).

6. The rotor of claim 5, wherein
said center hole (7) is disposed in said rotating spline (14);
said rotating spline (14) comprises multiple teeth (20); and
said teeth (20) are arc-shaped, rectangular, triangular, involute, ladder-shaped, or sawtooth-shaped.

7. The rotor of claim 6, wherein
multiple cylinders (10) are disposed around said rotating spline (14); and
an annular groove (11) is disposed at the center of said rotating spline (14).

8. The rotor of claim 2, further comprising a rotating spline (14) disposed in said base (5).

9. The rotor of claim 8, wherein
said center hole (7) is disposed in said rotating spline (14);
said rotating spline (14) comprises multiple teeth (20); and said teeth (20) are arc-shaped, rectangular, triangular, involute, ladder-shaped or sawtooth-shaped.

10. The rotor of claim 9, wherein multiple cylinders (10) are disposed around said rotating spline (14); and an annular groove (11) is disposed at the center of said rotating spline (14).

11. The rotor of claim 2, wherein multiple axial supporting ribs (17) and multiple annular supporting ribs (18) connected with one other are disposed at the top and the bottom of said base (5).

12. The rotor of claim 2, wherein multiple grooves (13) are disposed on both ends of said side wall (1);

the number of said grooves (13) is the same as that of said magnetic tiles (6); and said groove (13) is step-shaped.

13. The rotor of claim 2, wherein said magnetic tiles (6) are tightly surrounded by and abut against said side wall (1).

14. A method for producing the rotor of claim 2, comprising (a) integrally forming by injection molding a magnetic yoke shell (12) and multiple magnetic tiles (6);

(b) forming a side wall (1) on said magnetic yoke shell (12) and an end cover (2) at the bottom of said side wall (1);

(c) forming a base (5) at the center of said end cover (2); and (d) integrally forming by injection molding said base (5) and a rotating spline (14).

15. An external rotor for a direct current drive motor, comprising a side wall (1);

an end cover (2) directly connected to said side wall (1); a cavity (3) formed between said side wall (1) and said end cover (2); a plurality of openings (4) formed in said side wall (1); a base (5) disposed at the center of said end cover (2); a plurality of magnetic tiles (6) received in a plurality of said openings (4); a magnetic yoke shell (12) disposed against said side wall (1); a center hole (7) disposed at the center of said base (5); multiple wind wheels (8); and an air inlet (9) disposed between adjacent wind wheels (8); wherein said side wall (1) and said end cover (2) are integrally formed by injection molding; only said air inlet (9) is disposed between two adjacent wind wheels (8); and said base (5) is connected to said side wall (1) via said wind wheels (8).

* * * * *